United States Patent [19]
Collins et al.

[11] Patent Number: 6,106,700
[45] Date of Patent: *Aug. 22, 2000

[54] METHOD OF TREATING CRUDE OIL WITH AN AMINE OXIDE COMPOUND

[75] Inventors: Bevan C. Collins, Bartlesville, Okla.; Pat A. Mestetsky, St. Charles, Ill.

[73] Assignee: United Laboratories International, LLC, St. Charles, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/557,607

[22] Filed: Nov. 14, 1995

[51] Int. Cl.⁷ .......................... C10G 33/04; E21B 43/00
[52] U.S. Cl. ...................... 208/188; 208/187; 210/632; 210/708; 166/310
[58] Field of Search .................... 208/179, 187, 208/188; 210/632, 708; 166/310

[56] References Cited

U.S. PATENT DOCUMENTS

| | | | |
|---|---|---|---|
| 4,250,021 | 2/1981 | Salusinszky | 208/179 |
| 5,459,066 | 10/1995 | Mestetsky | 435/266 |
| 5,660,732 | 8/1997 | Mestetsky | 210/708 |
| 5,686,297 | 11/1997 | Mestetsky | 435/266 |

FOREIGN PATENT DOCUMENTS 9305187 3/1993 WIPO .

OTHER PUBLICATIONS

United Laboratories, ZYME–Flow United 656 Bulletin, 1991.
United Labortories, ZYME–Flow United 555 Bulletin, 1985.
ZYME–Flow Super Concentrate Enzyme–Based Grease, Solubilizer, United 555, 1986, United Laboratories.
ZYME–Flow Super Concentrate Enzyme–Based Grease Solubilizer United 555, 1986, United Laboratories.
ZYME–Flow Super Concentrate Enzyme–Based Grease Solubilizer, United 555, 1986, United Laboratories.
ZYME Flow Super Concentrate Enzyme–Based Grease Solubilizer, United 655, 1987, United Laboratories.
ZYME Flow, WWT Super Concentrate Enzyme–Based Grease Pre–Digester United 655, 1988, United Laboratories.

*Primary Examiner*—Walter D. Griffin
*Attorney, Agent, or Firm*—Andrus, Sceales, Starke & Sawall

[57] ABSTRACT

An aqueous composition containing an amine oxide surfactant, and preferably containing an amine oxide surfactant and enzymes, is added to crude oil, preferably by injecting the composition into the oil well, or adding the composition to pipelines or tankage containing the oil. An acid can also be used in conjunction with the composition. The composition acts to remove hydrocarbon contamination, from the well bore and mechanical components and further serves to break up the oil/water/sludge emulsion being delivered from the well head to facilitate separation of the oil. When used with an acid, the composition increases the effectiveness of the acid in removing inorganic contamination.

17 Claims, No Drawings

METHOD OF TREATING CRUDE OIL WITH AN AMINE OXIDE COMPOUND

BACKGROUND OF THE INVENTION

Crude oil as delivered to the sales-point can contain a substantial quantity of water, as well as solid particulate material, such as sand or mud. The oil, water and sludge are in the form of an emulsion, and in some cases the emulsion may contain up to 90% water. It is necessary to break the emulsion in order to separate the oil from the water phase and sludge. Breaking the emulsion is a difficult procedure, requiring expensive and complicated processing equipment. In some cases the emulsion cannot completely be broken, with the result that the oil is relegated to secondary uses.

It is recognized that hydrocarbon contaminants, as well as inorganic contaminants, such as calcium or ferrous compounds, can accumulate in the well, in the rock around the well, and on the mechanical components of the well, as well as in pipelines and storage tanks for the crude oil. The hydrocarbon contaminants tend to bond the heavier inorganic contaminants to the well casing and other components of the well, and heavier agglomerated inorganic contaminants will also tend to settle to the bottom of the well as a sludge. In certain situations, the build-up of the contaminants may be so great that the well will plug.

In the past, it has been the general practice to treat a well with a mineral acid, such as hydrochloric acid or sulfuric acid, in an attempt to remove the inorganic deposits. The acid is either dumped or pumped into the wellhead or circulated into the well, pipeline, treating vessels or storage tanks, by auxiliary piping. While the acid will tend to remove the inorganic deposits or contamination from the well bore as well as from the mechanical components of the well, it is believed that the acid also promotes the oil/water/solid particle emulsion which is delivered to the wellhead.

Certain aqueous industrial and household cleaners, as well as laundry detergents, contain a mixture of enzymes and surfactants. The enzymes can include one or more of a combination of proteases, amylases, lipases, cellulases, and pectinases and serve to attack or degrade organics such as grease, oil, or other soil, while the surfactant acts to disperse the degraded particles in the aqueous phase. Surfactants contain both hydrophilic and oleophilic groups, and according to the dispersion mechanism, an oleophilic group on the surfactant will attach to a particle of the oil, grease, or other soil, and pull it into dispersion by the attraction of the surfactant's hydrophilic group, for the water with which it is added. The dispersion is maintained by the action of the surfactant's hydrophilic groups. The hydrophilic groups on different surfactant molecules repel each other which necessarily results in the repulsion between the particles of oil, grease, and soil.

One type of industrial use of cleaning compositions of this type containing enzymes and a surfactant is to remove soiled lubricant from industrial machinery. In this manner of treatment, the aqueous cleaning composition containing a surfactant and enzymes is impinged on the surface to be treated through high pressure hoses or jets, and the residual wash water contains the soiled lubricant consisting of oil, grease, dirt, metal chippings, and the like, which are dispersed throughout the aqueous cleaning composition.

It has also been recognized, as disclosed in U.S. Pat. No. 5,459,066 that the addition of an amine oxide surfactant and enzymes to oily waste water will result in the separation of an oil phase from the water phase when the waste water is permitted to stand in a quiescent state.

SUMMARY OF THE INVENTION

The invention is directed to a method of treating crude oil by incorporating with the oil an aqueous composition containing an amine oxide surfactant, and preferably containing the combination of an amine oxide surfactant and enzymes. In a further aspect of the invention, the amine oxide surfactant, with or without enzymes, can be combined with an acid.

In a preferred method of the invention, the aqueous composition is injected into the oil well, either by dripping, spraying, or pumping the composition into the annulus between the well casing and the central tube, in which case the composition will flow downwardly through the annulus and contact the oil at the bottom of the well, or alternately, by feeding the composition through auxiliary piping to the bottom of the well. The aqueous solution can also be fed down the central tube and up the annulus. It is also contemplated that the aqueous composition can be injected into pipelines carrying the crude oil or added to the crude oil in storage tanks or treating vessels. In either case, the treating composition will mix with the crude oil, and it is believed that the surfactant will react with and solubilize the hydrocarbon contaminants, and it is further believed that the enzymes aid in catalyzing the reaction.

As a further advantage, the treating composition will also act to break or destroy the oil/water/solid particle emulsion that is being delivered to the sales point. This result is unexpected in that the incorporation of the surfactant would normally be expected to promote an emulsion, but instead the combination of the surfactant and enzymes function to break the emulsion, so that the oil can be more readily separated from the water phase and the solid sludge, thus substantially increasing the quality of the oil.

Therefore, the method of the invention not only acts to remove hydrocarbon deposits or contamination from the well and the mechanical components of the well, but also serves to break up the oil/water/solid particle emulsion that is delivered from the wellhead.

When used in conjunction with an acid, the treating composition acts to solubilize the hydrocarbon binders that bond inorganic particles together, as well as bonding the inorganic particles to the well bore and mechanical components of the well. In other situations, the hydrocarbon contaminants may merely coat the inorganic particles, rather than acting as a binder, rendering the particles impervious to attack by the acid and the coated particles will agglomerate as a heavy sludge. By solubilizing and removing the hydrocarbon binders and hydrocarbon coating, the inorganic particles will be more readily exposed to the acid, thus increasing the effectiveness of the acid treatment in removing inorganic deposits or contamination.

The amount of the treating composition to be added to the crude oil is not critical and depends primarily on the composition of the oil. In a typical application, the treating composition may contains from 0.9 to 12 parts by weight of the surfactant to 1 part by weight of the enzymes. The acid can be used in a weight ratio of about 0.01 to 2500 parts by weight of the acid to one part by weight of the surfactant. In practice, the treating composition can be added to the crude oil in the ratio of about 1 part by weight of the treating composition to 1 to 15,000 parts of the crude oil.

Other objects and advantages will appear in the course of the following description.

DESCRIPTION OF THE PREFERRED EMBODIMENT

Crude oil, as delivered to the sales point, contains a substantial portion of water, along with solid particulate material, or sludge. The oil water and solids are normally in the form of an emulsion. In certain instances, the crude oil emulsion can contain as much as 90% by weight of water.

Depending on the composition of the oil, a typical oil well may develop large accumulations of both hydrocarbon and inorganic contaminants. The hydrocarbon contaminants, which can be paraffinic compounds, act as binders and/or coatings for the inorganic particles, composed primarily of calcium and ferrous compounds, so that the contamination will tend to accumulate on the well, pipeline or tankage, as well as on the other mechanical components of the well. Further, as the inorganic contaminants are heavier than oil, they will agglomerate and settle to the bottom of the well, or in pipelines or tankage in the form of a sludge. In certain instances, the accumulation of the contaminants on the well casing and on the mechanical components of the well, as well as in the form of a sludge in the bottom of the well, can be so severe that it will restrict the flow of oil from the well, thus plugging the well. In addition, the buildup of sludge in pipelines can eventually slow or stop the flow of oil, and the buildup of sludge in storage tanks can contaminate the oil to a point where it is unsalable.

In accordance with the invention, the crude oil is treated by incorporating with the oil an amine oxide surfactant, and preferably the combination of an amine oxide surfactant and enzymes. In a further aspect of the invention, the surfactant with or without enzymes is added to the crude oil in the oil well in conjunction with an acid, and the combination of the surfactant, enzymes and acid provide a synergistic effect in removing both hydrocarbon contamination and inorganic contamination from the well.

The surfactant to be used in the invention is a water soluble, amphoteric type with an HLB (hydrophilic-lipophilic balance) of 8 to 14. More particularly, the surfactant can have the following formula:

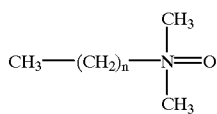

where n is 6 to 20. Specific examples of a surfactant covered by the above formula are lauryl dimethylamine oxide, stearyl dimethylamine oxide, myristyl dimethyl amine oxide, and mixtures thereof. The preferred surfactant of this group is lauryl dimethylamine oxide.

The enzymes that can be incorporated with the surfactant are selected from the group consisting of proteases, amylases, lipases, cellulases, pectinases, and mixtures thereof.

Preferably, the enzyme is selected from the group consisting of bacterial protease from *Bacillus subtilis,* amylase from *Bacillus subtilis,* lipase from *Aspergillus nicer,* cellulase from *Aspergillus niger,* pectinase from *Aspergillus niger,* and mixtures thereof. More preferably, the method of the present invention utilizes an enzyme mixture of protease from *Bacillus subtilis,* amylase from *Bacillus subtilis,* lipase from *Aspergillus niger,* and cellulase from *Aspergillus niger.* A mixture of enzymes of this type is sold by Applied Biochemists, Inc., Milwaukee, Wis. under the trademark "AMERZYME-A-100".

More particularly, "AMERZYME-A-100" contains 150 FCC/gm lipase, 320 PC/gm protease, 1350 BAU/gm bacterial amylase, and 320 C-ASE/gm cellulose, all of which are fungal in origin.

The acid which can be utilized with the surfactant and enzymes is preferably a mineral acid. Hydrochloric acid and sulfuric acid are preferred, because they are readily available and relatively inexpensive. Other acids such as acetic, citric, phosphoric, nitric, and the like, can also be utilized.

The amount of the surfactant to be incorporated with the crude oil is not critical and depends largely on the composition of the crude oil, as well as the nature of the contamination in the well. In practice, the treating composition can be used in a weight ratio of 1 part of the composition to 1 to 15,000 parts of the crude oil, based on 100% active ingredients. The enzymes can be used in weight ratio of 0.9 to 12 parts of surfactant to 1 part of enzyme, based on 100% active ingredients and the acid can be employed in a weight ratio of about 1 to 2500 parts of acid to 1 part of surfactant, again based on 100% active ingredients. The acid can be incorporated directly in the aqueous solution containing the surfactant, or surfactant and enzymes, or alternately, the acid can be fed into the oil well as a separate solution.

In a preferred method of the invention, the treating composition is added to the crude oil in the well by feeding the composition, either by pumping, dripping or spraying, into the annular space between the well casing and the central delivery tube. The composition will flow or drip downwardly along the well casing and along the outer surface of the tube and mix with the oil at the bottom of the well. Alternately, the treating composition can be delivered directly to the bottom of the well by auxiliary piping or, in other cases, the composition can be added to the crude oil as it is flowed through piping from the wellhead to storage tanks or other processing equipment. The composition can also be added directly to storage tanks or processing vessels containing the crude oil. In either case, the components of the treating composition will mix with the oil.

When added to the well the surfactant in the treating composition will act to solubilize the hydrocarbon contamination on the rock and on the mechanical components of the well. The hydrocarbon contamination can also act as a binder to bond inorganic particles, such as calcium carbonate, or iron oxide, together, as well as bonding these particles to the well casing and other mechanical components of the well. The hydrocarbon contaminants may also merely coat the inorganic particles, rather than acting as a binder, and the coated particles can agglomerate as a sludge. The surfactant, by solubilizing the hydrocarbon binders and coatings, will expose the inorganic particles, so that they can be more readily attacked by the acid. Thus, through use of the invention, the acid treatment is more effective. It is believed that the enzymes act as a catalyst to improve the action of the surfactant in solubilizing the hydrocarbon contamination, and it is further believed that the enzymes may also catalyze the reaction of the acid with the inorganic particles.

The treating composition containing the surfactant, and preferably the surfactant and enzymes, also provides an additional function in tending to break the oil/water/solid particle emulsion that is delivered from the wellhead. Surfactants are often employed as emulsifiers to create or promote an emulsion. However, in the present situation, the amine oxide surfactant does not function exclusively as an emulsifier, but instead, for some unexpected reason, along with the enzymes, serves to break or destroy the emulsion after a short period of time. The crude oil being withdrawn from the wellhead is preferably delivered to storage tanks or separation tanks and maintained in a relatively quiescent state to promote segregation of the oil phase from the water phase and the solid phase or sludge.

Through use of the invention, the well casing, as well as the mechanical components of the well can be maintained in a relatively clean condition, minimizing the accumulation of contaminants and preventing possible plugging of the well. The invention further tends to break the oil/water/solid emulsion being delivered from the wellhead, or present in pipelines, tankage or treating vessels, to thereby facilitate the separation of the oil from the water phase and solid contaminants. The invention also promotes the cleaning of equipment that transports or stores the oil after the wellhead.

We claim:

1. A method of treating an oil well, comprising the steps of introducing into an oil well containing crude oil, water, inorganic contaminants and hydrocarbon contaminants bonded to said inorganic contaminants, a mixture of an acid and an amine oxide surfactant having the following formula:

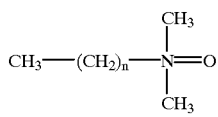

where n is 6 to 20, reacting said amine oxide surfactant with said hydrocarbon contaminants to solubilize said hydrocarbon contaminants and expose the inorganic contaminants, reacting said acid with the exposed inorganic contaminants to provide a water soluble reaction product and solubilizing the reaction product in the water, and thereafter separating said crude oil from the water.

2. The method of claim 1, wherein the step of separating the crude oil from the water comprises introducing the crude oil and water into a storage vessel, and maintaining the crude oil and water in said vessel in a relatively quiescent state to permit the crude oil to separate as an oil phase from the water, and separating the oil phase from said water.

3. The method of claim 1, and including the step of incorporating enzymes with said mixture.

4. The method of claim 3, wherein said enzymes are selected from the group consisting of proteases, amylases, lipases, cellulases, pectinases, and mixtures thereof.

5. The method of claim 3, wherein said surfactant is present in a weight ratio of 0.9 to 12 parts of the surfactant to 1 part of the enzymes based on 100% active ingredients.

6. The method of claim 5, wherein said acid is present in a weight ratio of 1 to 2500 parts by weight of the acid to 1 part of the surfactant based on 100% ingredients.

7. The method of claim 1, wherein said acid is selected from the group consisting of hydrochloric, sulfuric, nitric, phosphoric, acetic, citric and mixtures thereof.

8. A method of treating a crude oil supply system, said system containing a mixture of crude oil and water and also containing hydrocarbon and inorganic contaminants, comprising the steps of incorporating in said crude oil supply system an amine oxide compound having the following formula:

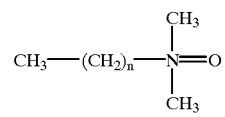

where n is 6 to 20 and reacting said amine oxide compound with said contaminants to form a reaction product that is dispersible in said mixture, maintaining the mixture in a relatively quiescent state to permit the crude oil to separate as an oil phase from a water phase and solubilizing the reaction product in the water phase of said mixture, and thereafter separating the oil phase from said water phase.

9. The method of claim 8, wherein said crude oil supply system includes an oil well and said method includes the step of adding said amine oxide compounds directly to said oil well.

10. The method of claim 8, and including the step of adding an acid to the crude oil in conjunction with said compound.

11. The method of claim 10, wherein said acid is a mineral acid.

12. The method of claim 11, wherein said acid is selected from the group consisting of hydrochloric, sulfuric, nitric, phosphoric, acetic, citric and mixtures thereof.

13. The method of claim 8, and including the step of incorporating enzymes with said compound.

14. The method of claim 13, wherein said compound and said enzymes are added to said mixture as an aqueous composition.

15. The method of claim 8, wherein the amine oxide compound is selected from the group consisting of lauryl dimethyl amine oxide, stearyl dimethyl amine oxide, myristyl dimethyl amine oxide, and mixtures thereof.

16. A method of treating a crude oil supply system, comprising the steps of introducing into a crude oil supply system containing a mixture of crude oil, water, inorganic contaminants and hydrocarbon contaminants bonded to said inorganic contaminants, an acid and an amine oxide compound having the following formula:

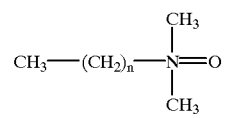

where n is 6 to 20, reacting said amine oxide compound with said hydrocarbon contaminants to form a reaction product that is dispersed in said mixture and expose the inorganic contaminants, reacting said acid with the exposed inorganic contaminants to provide a water soluble reaction product and solubilizing the reaction product in the water, and thereafter separating said crude oil from the water.

17. The method of claim 16, wherein said crude oil supply system includes an oil well and said method includes the step of adding said amine oxide compound directly to said oil well.

* * * * *

UNITED STATES PATENT AND TRADEMARK OFFICE
CERTIFICATE OF CORRECTION

PATENT NO. : 6,106,700
APPLICATION NO. : 08/557607
DATED : August 22, 2000
INVENTOR(S) : Collins et al.

It is certified that error appears in the above-identified patent and that said Letters Patent is hereby corrected as shown below:

Column 3, lines 35 to 40, column 5, lines 16 to 21, claim 1, column 6, lines 1 to 6, claim 8, and column 6, lines 40 to 44, claim 16, cancel the formula, each occurrence, and insert the following formula for each occurrence:

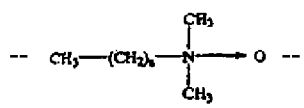

Signed and Sealed this

Seventh Day of July, 2009

JOHN DOLL
*Acting Director of the United States Patent and Trademark Office*